United States Patent [19]

Knowles

[11] 4,194,462
[45] Mar. 25, 1980

[54] OPTICAL WAVEGUIDE COATING ASSEMBLY

[75] Inventor: Daniel H. Knowles, Painted Post, N.Y.

[73] Assignee: Corning Glass Works, Corning, N.Y.

[21] Appl. No.: 935,509

[22] Filed: Aug. 21, 1978

[51] Int. Cl.² .......................... B05C 3/02; C03C 25/02; C03B 37/00; B05C 3/12
[52] U.S. Cl. ...................................... 118/405; 65/3 R; 65/3 A; 65/11 R; 118/DIG. 18; 427/434.7
[58] Field of Search .................. 118/405, DIG. 18; 427/434 E; 65/3 R, 3 A, 11 R

[56] References Cited
U.S. PATENT DOCUMENTS 3,960,530 6/1976 Ixengar .............................. 118/405

Primary Examiner—Richard L. Schilling
Attorney, Agent, or Firm—Walter S. Zebrowski; Clarence R. Patty, Jr.; Richard E. Kurtz

[57] ABSTRACT

A coating assembly including a recessed housing for receiving a split coating die, and a thrust block for urging the die against a die closing plate. Aligned passages extending through each of the elements are accessed through a split or slot in the side of each element so that an optical waveguide can be inserted into the apparatus from the side, rather than threaded endwise through the apparatus. Liquid coating material is introduced into the passages, the coating die serving to determine the thickness of the coating which is ultimately formed upon the waveguides.

11 Claims, 4 Drawing Figures

OPTICAL WAVEGUIDE COATING ASSEMBLY

BACKGROUND OF THE INVENTION

The present invention relates to the formation of optical waveguides, and more particularly to improved apparatus for coating such waveguides.

As is now well known, optical waveguides comprise thin strands of an optical material such as glass, which exhibit a radially-varying index of refraction. The change in refractive index, commonly formed by the interface of two or more concentrically disposed layers of material, effects an internal reflection of light rays so that a beam of light is continually reflected or guided within the optical waveguide with a minimum of energy loss.

In the manufacture of optical waveguides, it has been found necessary to provide the guides with an appropriate coating. The coating, usually of a material having a lower refractive index than the waveguide material, serves to provide optical insulation to the waveguide and protects it from abrasion, nicks and other physical damage. In many applications a lacquer or similar coating material is used, and applied to the waveguide surface by pulling the waveguide through an applicator.

Inasmuch as waveguides are commonly formed by drawing from a glass blank and subsequently winding them upon a takeup drum or reel, it is advantageous to be able to apply the coating to the optical waveguide subsequent to drawing but before it is wound upon the reel. Otherwise, the waveguide would have to be unwound from the reel, passed through a coating apparatus, then wound upon a second reel. Due to the great length of the waveguide and its relatively fragile nature, such unnecessary handling is to be avoided if possible.

Accordingly, apparatus have been devised for applying a liquid coating to a moving strand of optical waveguide immediately after drawing, and for drying the coating before the waveguide is wound upon the takeup reel. A small die or the like having a suitably-sized aperture is commonly provided, and an enclosure provided adjacent the die for receiving liquid coating material. As an optical waveguide traverses the apparatus, it passes through a volume of the coating material. The amount of coating left on the surface of the guide is determined by the size of the die, and after emergence from the die the coated waveguide is passed through a drying station to cause the coating to solidify before the guide is wound upon a takeup reel or the like.

While the foregoing system works well in practice insofar as applying the coating is concerned, substantial difficulties arise when it is necessary to start a new waveguide through the system, or to clean accumulated chips or other foreign matter from the area of the die.

When commencing to draw a waveguide fiber from the fused end of a glass blank, it is highly desirable that the draw speed be maintained. However, in currently used systems it is necessary to cease drawing the fiber long enough to insert the leading end of the guide through the coating apparatus, and thread the guide through the necessary apertures. This procedure calls for considerable manual dexterity and practiced skill; and even with the most adept of operators the delay in drawing the strand from the glass blank often gives rise to an enlarged, globular portion in the area of the waveguide which was adjacent the drawing blank when the drawing process was interrupted. If of sufficient size, this globular portion will jam in the orifice of the coating apparatus, breaking the waveguide and necessitating a repetition of the threading process.

In other instances foreign matter, chips and the like accumulate about the coating die orifice as the waveguide is passed through the coating apparatus. Ultimately, this buildup must be removed before drawing can continue. In order to clean the orifice it is necessary to break the waveguide and pull the free end through the coating apparatus, then remove the clogged die and clean it. Upon reassembly of the coating apparatus the previously-broken leading end of the waveguide must be re-threaded through the device. This not only absorbs valuable manufacturing time, but hinders the production of extremely long waveguides. For all of these reasons, it should be apparent that it would be of great value to provide a coating apparatus for optical waveguides which does not require that a free end of a waveguide be threaded through the apparatus.

It is therefore an object of the present invention to provide an improved coating apparatus for optical waveguides.

Another object of the invention is to provide a coating apparatus for applying a liquid coating to the surface of a moving optical waveguide strand, which does not require that the strand be threaded endwise through the apparatus.

Yet another object of the invention is to furnish a coating apparatus including a generally circular aperture for receiving a moving strand, which initially receives the strand through one side thereof.

Yet another object is to provide a coating apparatus which is capable of receiving an uninterrupted length of waveguide.

SUMMARY OF THE INVENTION

Briefly stated, in accordance with one aspect of the invention the foregoing objects are achieved by providing a housing which receives a thrust member and a coating die. A die closing plate associated with the housing receives the split coating die in such a manner as to force the coating die closed when pressure is applied to the thrust member. The housing, thrust member and die closing plate all include apertures or passageways which align with the opening in the coating die, and locating means are provided to align the coating die split with the slots. A reservoir of coating material is associated with the housing, and supplies liquified coating material to the region about the die for coating the strand before it passes through the latter.

In a preferred embodiment, pressure is applied to the thrust member by means of a captive clamp nut or the like. The clamp nut is also split by means of a slot, and when it is properly aligned with the other portions of the apparatus a continuous waveguide can be inserted directly into the appropriate passages. The assembly is then closed by means of a cover or the like and the clamp nut rotated to urge the coating die against the closing die, whereupon a closed aperture is formed about the waveguide.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

FIG. 1 illustrates a system for drawing optical waveguides and the like;

DESCRIPTION OF A PREFERRED EMBODIMENT

Figure 1:
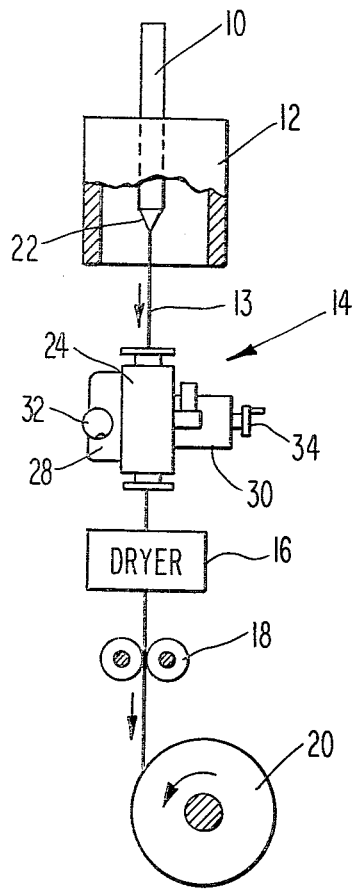

FIG. 1 illustrates a glass waveguide drawing system wherein a waveguide blank 10 is at least partially surrounded by a furnace or the like 12. A strand 13 drawn from the waveguide blank traverses a coating stage generally indicated at 14, and then passes through dryer 16. A tractor assembly including belts or rollers 18 grips the strand and provides the pulling force for drawing the latter from the waveguide blank. Finally, the finished strand is wound upon a takeup reel 20.

Blank 10 may be of any appropriate form, although it is commonly in the shape of an elongate cylinder. Alternatively, the blank may be a tube or have various other cross-sectional forms.

As will be understood by those skilled in the art, the refractive index of the blank should vary radially; this may be achieved in a variety of ways including the use of a drawing blank formed of a rod or core disposed within a tube of a material having a lower index of refraction. Such aspects of the system are considered to be well known to those skilled in the art, and as set forth in "Fiber Optics, Principles and Applications" by N. S. Kapany (Academic Press, 1967) various materials and physical configurations may be selected for a blank depending upon the characteristics desired of the finished strand. Blank 10 is conventionally gripped by appropriate movable means (not shown) which feed the blank into furnace 12 at a predetermined rate. Within the furnace the leading edge of the blank is softened so that it may be drawn into a small waveguide. Various process parameters including temperature, blank size and draw speed may be varied in order to precisely control the size of the drawn waveguide.

As will be more fully described hereinafter, coating assembly 14 comprises a body portion 24 having appropriate orifices through which the waveguide strand 13 passes. During its passage through the coating apparatus the strand is surrounded by a fluid coating material, the amount of material accumulating on the surface of strand 26 being determined principally by the size of the orifice through which the latter passes. In order to position the orifice concentrically with strand 13 a locating apparatus such as a commercially available X-Y slide may be used. Accordingly, slides 28 and 30 lie orthogonally to one another and knobs or handles 32, 34 are provided so that the slides may be independently positioned. Of course, other appropriate locating means may be selected and it will be appreciated that the X-Y slides described herein are illustrated by way of example and not limitation.

As the coated strand emerges from the coating apparatus it is passed through a dryer 16, which may comprise an enclosure heated by means of electrical resistance heating units or the like. The elevated temperatures provided by dryer 16 serve to accelerate the drying and hardening of the newly-applied coating, and after emerging from the dryer the coating may safely be gripped by a drawing tractor including wheels 18. As is familiar to those skilled in the art, the drawing tractor supplies the motive force for pulling the drawn strand from the softened end of blank 10. Finally, the coated, dried waveguide is wound upon a takeup reel 20 and may be stored thereon for transportation and subsequent use.

Figure 2:
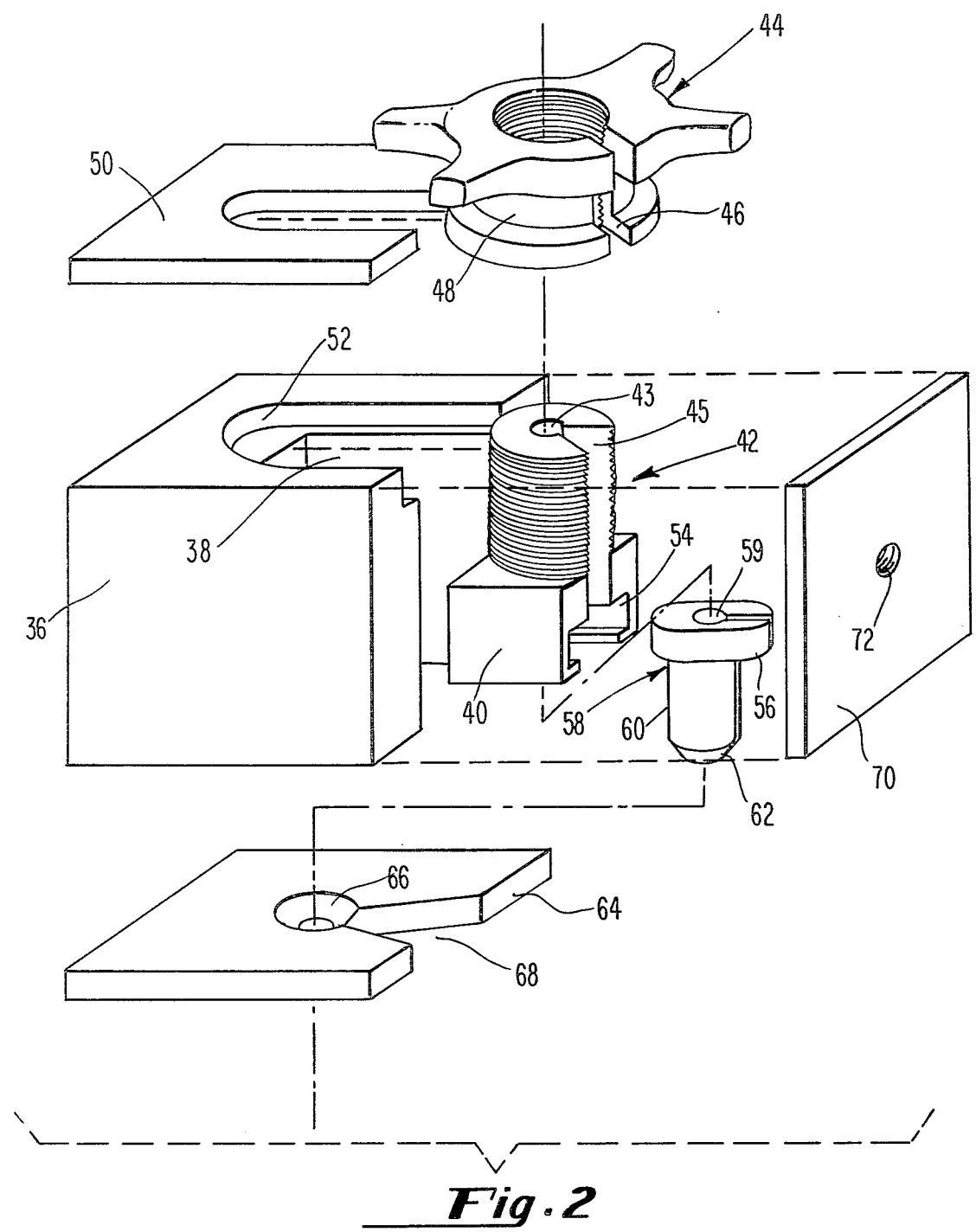
FIG. 2 is an exploded view of one embodiment of the invention.

In FIG. 2 there is shown a presently preferred embodiment of the coating apparatus, including a housing 36 which may be formed of a single, rigid metal block. A recess 38 extends throughout the length of the housing, for slidingly receiving the sides of a thrust member generally indicated at 42. The upper end of the thrust member is threaded and is engaged by the mating, threaded orifice of a pressure-applying means, here clamp nut 44. The clamp nut has a slot 46 formed therein which extends completely through the nut from top to bottom and provides access from without the nut to the inner surface of its threaded aperture. Further, a concentric relief or groove 48 is provided to allow the nut to be encaptured by retainer plate 50, which is affixed to housing 36 by means of appropriate screws, bolts or the like. An additional, relieved area 52 adjacent recess 38 in the applicator housing provides clearance for the lowermost, enlarged end of the clamp nut.

Returning to thrust member 42, it will be seen that a lateral groove 54 is provided for receiving the enlarged head 56 of a coating die 58. Passage 43 extends longitudinally through the thrust member and a slot 45, also running the length of the thrust member, exposes passage 43 throughout its length. An orifice 59 extends longitudinally through the coating die, and generally corresponds in size to the desired diameter of a waveguide strand bearing a wet layer of coating material. A split in the die provides access to the orifice throughout the full length of the die. The die includes a cylindrical sidewall 60, and a first tapered surface 62 which extends about the die. A die closing plate 64, adapted to be secured to the lower surface of housing 36, includes an aperture generally surrounded by a second tapered surface 66 in which die surface 62 seats. A slot 68 extends from the aperture in the middle of the die closing plate to one edge thereof. Finally, a cover member 70 is provided and serves to close the front surfaces of housing 36, forming a chamber therewithin which encloses coating die 60 and thrust member 42. Cover 70 is also provided with an opening 72 through which coating material may be introduced into the area above the coating die.

When assembled, the head 56 of the coating die is received in slot 54 of the thrust member. The opposing, flattened sides at either side of head 56 confront the walls of slot 54, and prevent the die from rotating. In addition, the flattened sides locate the die within the thrust member so that the die split is aligned with slot 45 of the thrust member. When seated, the orifice of the coating die 58 then substantially aligns with the longitudinal passageway 43 which extends through thrust member 42.

The thrust member is in turn fitted within recess 38 of housing 36. In the preferred embodiment shown, the lateral sides 40 of the thrust member align closely with the sides of slot 38 to allow the thrust member longitudinal, and preferably lateral, motion but prevent rotation of the thrust member. The upper, threaded end of the thrust member is received in the threaded aperture of clamp nut 44, which is in turn encaptured by the retainer plate 50.

In order to prepare the assembly to receive an optical waveguide, slot 46 of the clamp nut is aligned with longitudinal slot 45 extending through thrust member 42, and therefore with slot 68 in the die closing plate. In this manner there is constituted a continuous opening which extends throughout the assembly, allowing access to the passage followed by the waveguide through the coating apparatus. At this time, drawing of the waveguide may then begin. After the leading end of the drawn strand is fed through the dryer and tractor portions of the system, the moving strand may be placed in the coating assembly through the channel formed by the slots in the clamp nut, thrust block, coating die and die closing plate. After the drawn strand is in place and approximately centered in the aperture of the coating die, cover 70 is clamped in place over the front surface of the housing and clamp nut 44 rotated so as to urge thrust member 42 downwardly. As the thrust block moves downwardly, it bears upon the upper end 56 of the coating die and urges the first tapered surface 62 against the matching, second tapered surface 66 of the die closing block. The forces thus developed force the split in the side of the die closed, so that the wall of the die aperture is substantially smooth and continuous.

After the coating die is forced closed, the assembly is readjusted to assure that the drawn waveguide is running precisely in the center of the coating die aperture. An appropriate coating material, which may be a viscous lacquer, is then introduced through opening 72. The coating material enters the slot in the side of thrust member 42, above the head of the coating die, and surrounds the waveguide strand to a depth depending upon the height and pressure of the coating reservoir. As the strand is drawn downwardly through the assembly, it passes through the threaded aperture in clamp nut 46 and into thrust block 42, wherein it is bathed in the coating material. The diameter of the coating die aperture determines the thickness of the coating which remains upon the strand as it emerges from the die. The coated strand then passes downwardly from the coating apparatus and enters a dryer of the type shown in FIG. 1, wherein the volatile portions of the coating are driven off, and the coating dried.

The type of coating material, diameter of waveguide strand, and thickness of coating may all vary considerably depending upon the type of waveguide to be produced, its end use, light propagation characteristics, and many other aspects. In one successfully tested embodiment a glass waveguide having a diameter of approximately $127\mu$ was coated with a clear lacquer and passed through a coating die having an aperture approximately $400\mu$ in diameter. After drying the lacquer coating was reduced substantially in thickness, eventuating in a final coating thickness of approximately $6\mu$. Of course, the relationship between the size of the orifice in the coating die and the ultimate thicknes of the dried coating depends upon many variables, and the optimum dimensions must be selected for each process.

Figure 3:
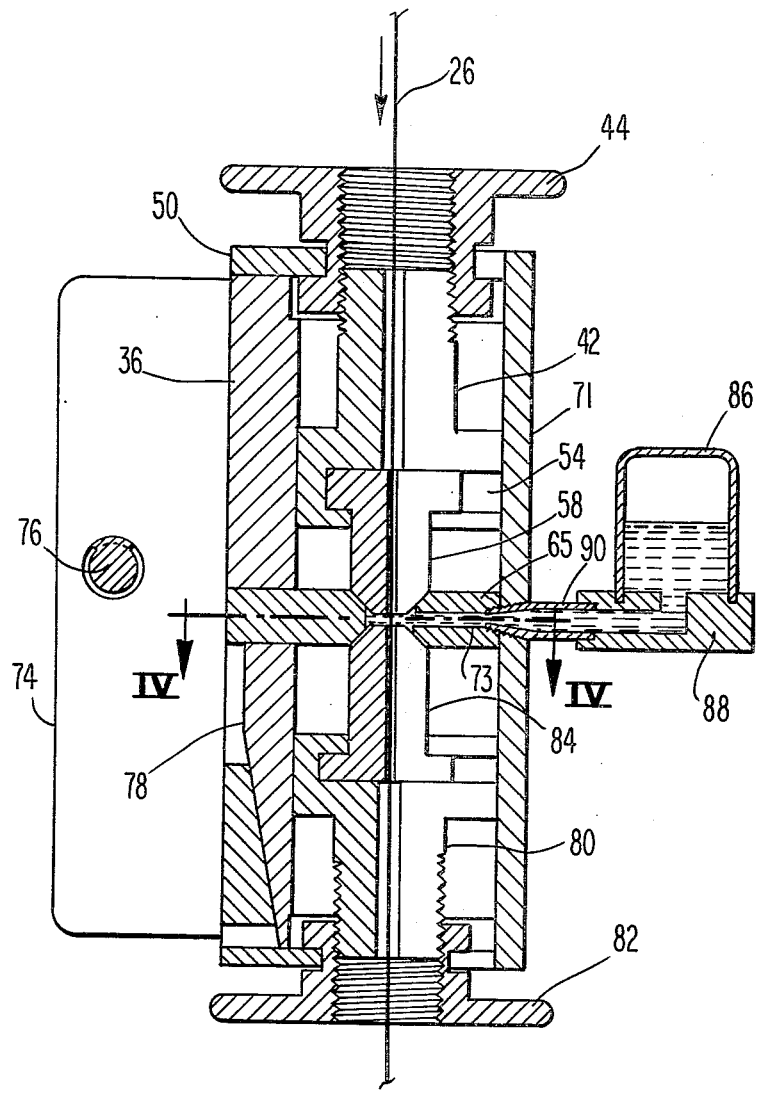
FIG. 3 is a sectional view of another embodiment of the invention.

Turning now to FIG. 3 there is shown another embodiment of the present invention, illustrating in further detail the operation of the invention. For ease in illustration, corresponding elements of FIGS. 2 and 3 bear corresponding numbers. Housing 36 is attached to the carriage 74 of an X-Y slider, which is in turn positioned by means of a screw 76 or the like. Coating die 58 is disposed within the slot 54 of thrust member 42, and clamp nut 44 rotated to urge the lowermost end of the die tightly against the corresponding tapered surfaces of die closing plate 64. In this manner the split in die 58 is completely closed, so that the die forms a smooth-sided aperture through which strand 26 may pass. As with the embodiment of FIG. 2, the die closing plate is shown as a separable element although it should be clear to those skilled in the art that such a die closing plate may equivalently be formed as an integral part of the housing.

A second, lower housing 78 is also provided, and encloses a second thrust member 80 which cooperates with a second clamp nut 82 and die 84 to close the split in the side of the latter, forming a second aperture which is precisely aligned with the aperture in the upper die 58. The area between the confronting dies, formed by a cavity 73 in the die closing plate, is in communication with a reservoir 86 containing an appropriate coating material. The base 88 of the reservoir communicates with the area within the die closing plate by means of a pipe or the like 90.

The aperture in the upper die 58 is substantially smaller than that of lower die 84, inasmuch as the function of the upper die is to locate the moving strand 26 concentrically within a larger, lower die. As the strand passes through die 58, it is thus precisely aligned in the center of the aperture of the lower die. As it passes through the bath of coating material, the waveguide is surrounded with coating material. The waveguide then passes through the aperture of die 84, whereby the thickness of the remaining coating is determined by the diameter of the latter die. The coated strand then passes downwardly through lower thrust member 80 and out through the threaded aperture of clamp nut 82 before being passed through the succeeding drying stage.

Figure 4:
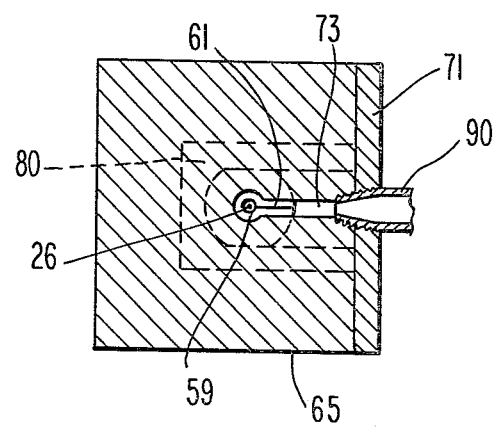
FIG. 4 is a transverse section taken along lines IV—IV of FIG. 3.

FIG. 4 illustrates the relationship between various elements of FIG. 3. As strand 26 passes through the cavity 73 it is wetted by a coating material. The coated strand is then extruded through aperture 59 of the die, whose split 61 has been completely shut due to the interaction of the tapered surfaces of the die and the die closing plate, as described above. The dotted lines indicate the general configuration of the thrust member 80, and further illustrate how the flattened sides of the head of the coating die prevent rotation of the latter within the thrust member.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A coating applicator for coating the surface of a moving optical waveguide of indeterminate length, comprising:

a coating die having an aperture extending therethrough and defining a split extending from said aperture to one edge thereof to provide access to the aperture throughout its length, said die having a first tapered surface lying generally about the longitudinal axis of said aperture;

a housing for receiving said coating die, said housing defining a recess extending substantially throughout the length thereof and including means for locating said coating die so that said split is in registration with said recess;

a die closing member adjacent said housing recess and defining an opening and a slot extending from the opening to the edge thereof and registering with the recess of said housing, said member further including a second tapered surface disposed about said opening and mating with said first tapered surface of said coating die;

pressure developing means associated with said housing for urging said coating die toward said die closing member whereby said first and second tapered surfaces cooperate to cause said split to close;

cover means in proximate relationship with said applicator housing and closing said recess; and a reservoir coupled in fluid flow relationship with the aperture of said coating die for supplying coating material thereto.

2. An applicator according to claim 1, further including a thrust member disposed in the recess of said housing and engaging said pressure developing means and said coating die.

3. An applicator according to claim 2, wherein said pressure developing means is threadedly coupled to said thrust member and bears against said applicator housing for urging said thrust member toward said die closing member.

4. A coating applicator according to claim 3, wherein said pressure developing means includes a generally central, threaded aperture and a slot extending outwardly from one side of said aperture and throughout the length thereof.

5. A coating applicator according to claim 2, wherein said applicator housing defines a recess in which said thrust member is slidingly received, said recess being formed to allow said thrust member to move in a direction parallel to the axis of said coating die, said recess further including means for resisting the rotation of said thrust member about said axis.

6. A coating applicator according to claim 5, wherein said coating die further comprises means extending laterally from the axis of the aperture thereof for engaging said thrust member and for resisting rotation of said coating die with respect to said thrust member.

7. A coating applicator according to claim 6, further including a second die having an aperture extending longitudinally therethrough and being split throughout the length thereof, the aperture of said second die being generally aligned with the aperture of the first die, said second die having a third, tapered surface lying generally about said aperture;

said die closing member including a fourth tapered surface about said opening for mating with said third tapered surface of said second die;

a second thrust member engaging said second die;

second pressure developing means associated with said second thrust member and said housing for urging said second die toward said die closing member whereby said third and fourth tapered surfaces cooperate to cause the split in said second die to close.

8. A coating applicator as defined in claim 7, wherein the aperture of said second die is substantially smaller than the aperture of said first die for locating a length of moving optical waveguides substantially in the center of the aperture of said first die.

9. A coating applicator for applying liquid coating to a moving, elongate optical waveguide, comprising:

an elongate, generally cylindrical coating die having an aperture extending longitudinally therethrough and a radially-extending split throughout the length thereof, said coating die having first and second ends and having a first tapered surface adjacent said first end;

an applicator housing for receiving said coating die therein, said housing defining a recess substantially throughout the length thereof;

a thrust block having a passageway extending therethrough and a slot extending outwardly from said passageway, said thrust block being disposed within said housing and bearing upon said coating die;

a die closing plate coupled to said applicator housing and defining an opening therethrough and a slot extending from the opening to the edge of the plate, said slot registering with said recess, and further having a second tapered surface about said opening for receiving said first tapered surface of said coating die;

retaining means rigidly coupled to said housing;

a clamp nut at least partially disposed between said retaining means and said thrust block for urging said thrust block toward said die closing plate, whereby the split of said die is caused to close; and a reservoir for retaining coating material and coupled in fluid flow relationship with the passageway of said thrust block for supplying coating material thereto.

10. A coating applicator according to claim 9, wherein said thrust block further comprises a threaded member extending generally coaxially with the passageway thereof; and said clamp nut comprises a threaded aperture for engaging said threaded member of said thrust block;

whereby rotation of said clamp nut urges said thrust block along said applicator housing recess toward said die closing plate.

11. A coating applicator according to claim 10, wherein said clamp nut further comprises a slot extending completely therethrough and registering with said threaded aperture.

* * * * *